United States Patent [19]

Krafka

[11] Patent Number: 5,615,744
[45] Date of Patent: Apr. 1, 1997

[54] GARDEN HAND TOOL

[76] Inventor: Edward G. Krafka, 144 Arlington Avenue, Ottawa, Ontario, Canada, K1R 5S7

[21] Appl. No.: 600,290
[22] Filed: Feb. 12, 1996
[51] Int. Cl.$^6$ ............................................. A01B 1/24
[52] U.S. Cl. .......................... 172/22; 172/21; 172/430
[58] Field of Search ........................ 111/92, 101, 106; 172/21, 22, 25, 371, 378, 380, 381, 430

[56] References Cited

U.S. PATENT DOCUMENTS

| 2,057,142 | 10/1936 | Fry | 172/22 |
| 3,123,391 | 3/1964 | Novak | 172/22 X |
| 3,210,112 | 10/1965 | Glynn | 172/22 X |
| 3,273,930 | 9/1966 | Gottfried | 172/22 X |
| 3,830,310 | 8/1974 | Williams | 172/22 |
| 4,848,484 | 7/1989 | Clements | 172/22 X |
| 4,932,339 | 6/1990 | List | 172/22 X |
| 4,974,682 | 12/1990 | Hoffman | 172/22 |

Primary Examiner—Terry Lee Melius
Assistant Examiner—Robert Pezzuto
Attorney, Agent, or Firm—Stanley E. Johnson

[57] ABSTRACT

A garden hand tool having a tubular outer member terminating at its bottom end in an elliptically shaped peripheral edge with such end being open, a plunger reciprocally mounted in the tubular member and a spring that resiliently biases the plunger upwardly in a direction away from the elliptically shaped open bottom end. The elliptically shaped peripheral edge is preferably in a plane disposed at an angle in a range of 15° to 22½° to the longitudinal axis of the tubular member so as to be readily forced by hand into the earth to remove a weed or plant. The plunger projects upwardly beyond the upper end of the tubular outer member providing a portion that can be readily grasped to push the plunger downwardly to remove any earth associated with the plant that might be stuck in the bottom end of the outer tubular member.

8 Claims, 1 Drawing Sheet

U.S. Patent
Apr. 1, 1997
5,615,744
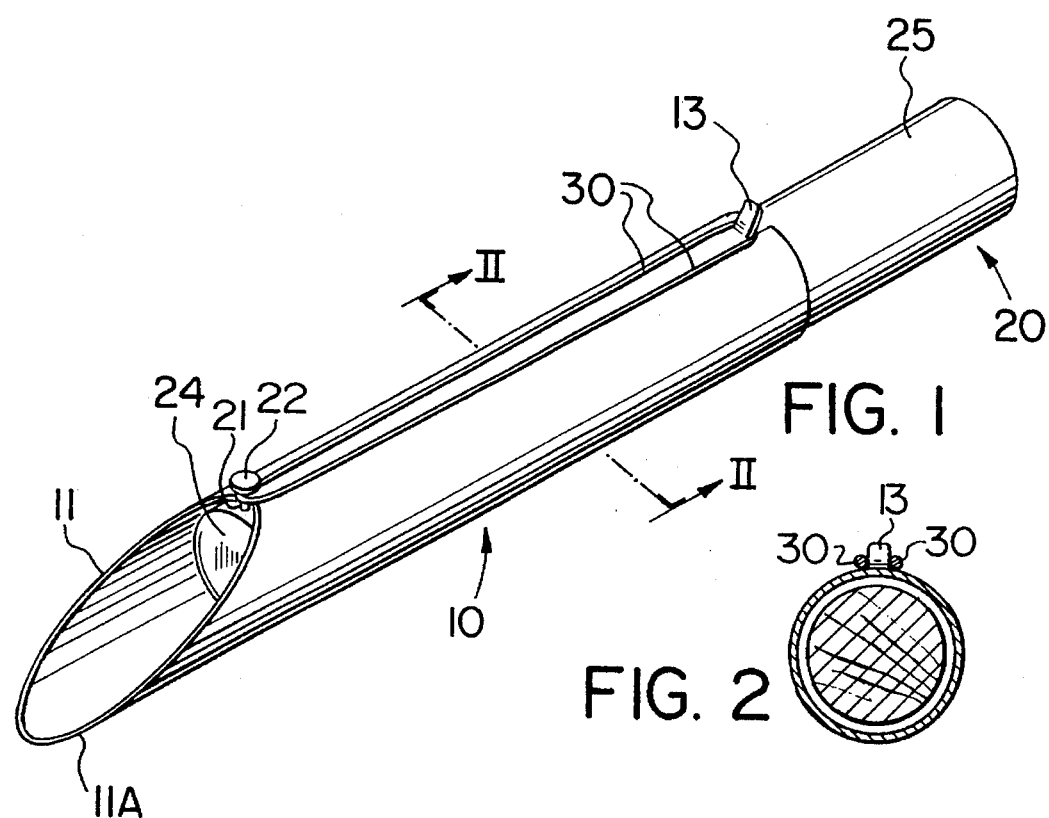
FIG. 1
FIG. 2
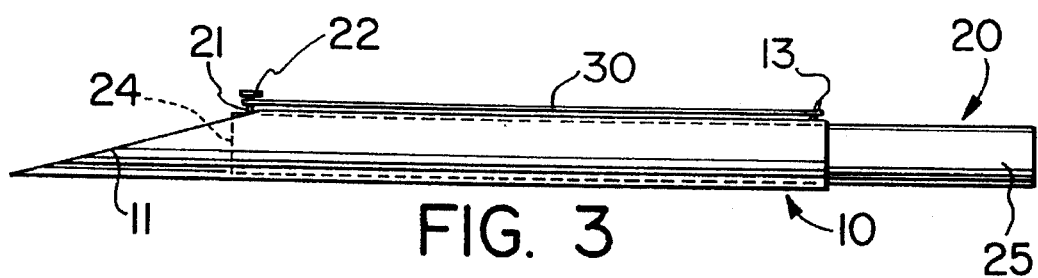
FIG. 3
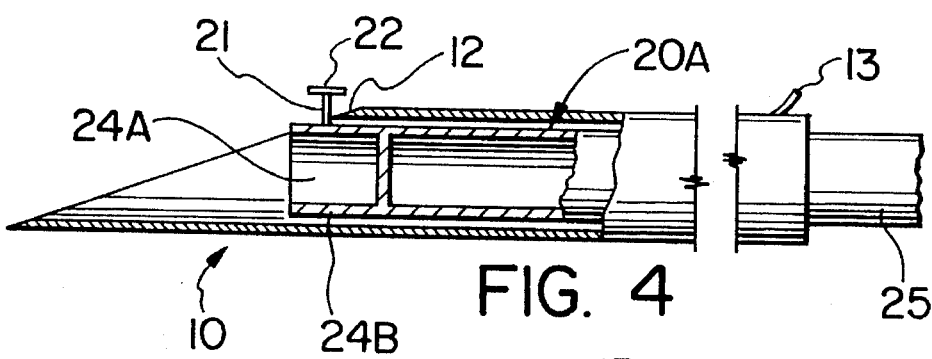
FIG. 4
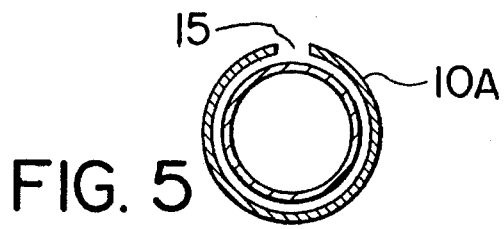
FIG. 5

GARDEN HAND TOOL

FIELD OF INVENTION

This invention relates generally to a hand tool for removing plants from the soil and incorporating means to discharge the removed plant from the tool.

BACKGROUND OF INVENTION

A spade-like, short handle tool, also known as a trowel, is conventionally used by a person for removing weeds from a garden or lifting root and plant from the soil for transplanting. These tools often bend at the juncture of the blade and handle when force is applied to the handle to try and remove the plant together with its roots by a prying action. To prevent this bending the soil must be extremely loose which is not always the case. Another drawback is that the earth often sticks to the blade of the trowel and this must be scraped off in some manner before continuing to use the trowel in removing another plant with its roots.

SUMMARY OF INVENTION

An object of the present invention is to provide a simple hand tool for removing plants individually from the earth in which the tool is light, but relatively strong for prying loose the plant and its roots.

A further object of the invention is to provide a tool of the foregoing type in which means is provided for removing the plant from the tool along with earth that has accumulated.

In keeping with the foregoing objects there is provided in accordance with the present invention a hand tool comprising a rigid elongate tubular member having one end thereof terminating in an elliptically shaped outer edge lying in a plane disposed at a selected angle to the longitudinal axis of the tubular member, said outer edge having a leading relatively sharp edge for ease of penetration into the earth; a plunger reciprocally mounted in said tubular member and spring means resiliently biasing said plunger in a direction towards an end of said tool opposite said one end.

LIST OF DRAWINGS

The invention is illustrated by way of example with reference to the accompanying drawings wherein:

FIG. 1 is an oblique view of a garden hand tool provided in accordance with the present invention;

FIG. 2 is a section along line 2—2 of FIG. 1;

FIG. 3 is a side elevational view of the tool;

FIG. 4 is a partial sectional view, of larger scale, illustrating an alternative construction for the plunger; and FIG. 5 is a cross-sectional view similar to FIG. 2 but illustrating an alternative construction.

DESCRIPTION OF PREFERRED EMBODIMENTS

Referring to the drawings there is illustrated a garden hand tool comprising a rigid, elongate, thin wall, tubular member 10 having an elliptically shaped edge 11 at one end thereof, a plunger 20 reciprocally mounted in said tubular member and an elastic means 30 attached at opposite ends respectively to the plunger and tubular member to bias the plunger in a direction away from the elliptical shaped open end.

The tubular member 10 is preferably a thin wall metal tube of suitable material or suitably coated on the inner and outer surfaces to prevent rusting. The tube, for example, may be stainless steel, aluminum or other metals which are suitably coated for example by chroming, to prevent rusting. The tubular member may be zinc or chromium plated rolled steel or in some cases made of a plastics material.

The elastic means 30, for example, is a rubber band anchored to the plunger by way of a pin 21 and to the sleeve by for example being looped around a lug 13. The lug is shown as an upwardly turned portion of the wall of the tube located at the trailing end of the tube but it could be readily located more forwardly toward the leading end of the tool. This provides an inexpensive anchor but obviously a number of other anchors will be readily apparent to anyone skilled in the art. In place of a loop the elastic means 30 may be a strip of elastic material anchored at one end to the plunger and at the other end to the sleeve.

The anchoring pin 21 is provided with a head 22 to prevent the band from slipping off during normal usage. The upwardly turn piece 13 may be provided with suitable rounded corners, padding or the like means to prevent cutting of the elastic band. The pin 21, as seen from FIG. 4 of the drawing, prevents rearward movement of the plunger by striking against the rear most edge 12 of the elliptical open end. Pin 21 serves as a stop defining the at rest position of the plunger, relative to the outer tubular member 10.

The elliptical edge 11 is located in a plane disposed at a selected angle to the longitudinal axis of the tubular member. The tubular member is preferably circular in cross-section and the selected angle is preferably in the range of 15° to 22° ½°. This provides a relatively sharp leading edge as indicated at 11A facilitating penetration of the hand tool into the earth.

The plunger 20 may be a shaft of wood as illustrated in FIGS. 1 and 2 and has a leading blunt end 24 for pushing the earth and plant from the tube 10 and a hand grip portion 25 at the opposite end that projects beyond the outer tubular member 10.

Referring to FIG. 4 there is illustrated a modified plunger 20A in which there is a cavity or recess 24A. The cavity 24A may be provided by a cap member 24B secured to a shaft which may be either solid or alternatively tubular as illustrated in FIG. 4. The cap 24B could be a piston member secured to a small diameter rod guided in the tubular member 10 by a sleeve type bearing not shown.

In an experimental device each of members 10 and 20 had a length of 11½ inches and the outer tubular member 10 had an internal diameter of approximately 1⅛ inches and a wall thickness of approximately 1 millimeter. Also in the same device the length of the tube from the trailing end to edge 12 measured approximately 8 inches. The edge 11 is elliptical in outline configuration and lies in a plane disposed at an angle of preferably about 18° to the longitudinal axis of the tube 10.

Referring to FIG. 5 there is illustrated an alternative for the tubular member 10 and which consists of a metal ribbon bent to form a generally cylindrical tubular member with the adjacent longitudinal edges of the ribbon spaced apart providing a longitudinal gap 15. If desired a piece transversing this gap and fastened to the tube may be used as an anchor for the elastic means and also rigidify the tool. In this embodiment the plunger may be a tubular member 20A as illustrated or a solid plastic rod or a wooden rod 25.

The foregoing described tool is a simple, strong, hand efficient garden tool suitable for transplanting seedlings, or loosening the soil, or making aeration holes in the soil or holes for depositing bulbs and/or seeds in selected areas and removing weeds individually from the earth. To use the tool one grasps the tubular member and pushes it endwise into ground to penetrate the earth below the root of the plant. The sharp edge 11A minimizes the manual effort required to do this. With the tool at an inclined angle one then pushes down using the tool as a pry with the earth being the fulcrum. The plant and its roots are thus loosened and readily lifted from the ground. A push on the plunger discharges the earth (and plant) from the tool.

I claim:

1. A garden tool comprising:
   (a) a rigid elongate tubular member terminating in an earth penetrating elliptically shaped outer peripheral edge at one end thereof, said edge having a relatively sharp leading edge facilitating penetration of such edge into the earth, said first member terminating in an open trailing end located opposite said earth penetrating end;
   (b) a second rigid elongate member telescopically disposed in said first member having a portion projecting from the trailing end of said first member, said second member providing at a first end thereof a plunger for discharging earth from said earth penetrating end of said first member and wherein said portion projecting from said first member provides a hand grippable portion;
   (c) spring means resiliently biasing said plunger in a direction away from said one end of said first member, said spring means comprising an elastic, stretchable member located on an outer surface of said first member, means anchoring said stretchable member at a first position to said first member and at a second position to said second member, said first and second positions being spaced apart from one another longitudinally along said tool; and
   (d) means limiting relative movement of said first and second members comprising pin means on said second member and a pin abutment portion on said first member, said spring means resiliently urging said pin means against said abutment portion on said first member which limits movement of said plunger into said first member in a direction toward the trailing end of such member.

2. A garden tool as defined in claim 1 wherein said first tubular member is metal.

3. A garden tool as defined in claim 1 wherein said first tubular member is thin wall metal tube.

4. A garden tool as defined in claim 3 wherein said metal tube is circular in cross-section.

5. A garden tool as defined in claim 1 wherein said ecliptically shaped edge is in a plane disposed at an angle in the range of approximately 15° to 22½° relative to the length of said first elongate tubular member.

6. A garden tool as defined in claim 5 wherein said tubular member is circular in cross-section and wherein said angle is approximately 18°.

7. A garden tool as defined in claim 1 wherein said first and second members are a pair of telescopically disposed thin wall metal tubes and wherein the innermost tube has a closed end providing said plunger.

8. A garden tool as defined in claim 1 wherein said first elongate tubular member has a lug protruding outwardly from the outer surface and wherein said elastic member is anchored at one end thereof to said lug and at another end thereof to said pin means.

\* \* \* \* \*